United States Patent [19]
Adachi

[11] 3,934,512
[45] Jan. 27, 1976

[54] LIQUID FUEL MULTISTAGE ROCKET

[76] Inventor: Kazuhide Adachi, No. 3393-7 Banchi, Sunagawa, Tachikawa, Tokyo, Japan

[22] Filed: Feb. 28, 1974

[21] Appl. No.: 446,699

[30] Foreign Application Priority Data
Dec. 3, 1973 Japan............................. 48-135961

[52] U.S. Cl. ................. 102/49.4; 60/39.48; 60/259
[51] Int. Cl.² ........................................... F02C 3/12
[58] Field of Search ......... 102/49.4, 49.5; 60/39.48, 60/259

[56] References Cited
UNITED STATES PATENTS

| | | | |
|---|---|---|---|
| 2,686,473 | 8/1954 | Vogel | 102/49.5 |
| 3,048,107 | 8/1962 | Samms | 102/49.5 |
| 3,067,682 | 12/1962 | Feldmann et al. | 102/49.5 |
| 3,199,455 | 8/1965 | Samms | 102/49.5 |
| 3,202,381 | 8/1965 | Wuenscher | 102/49.5 |
| 3,218,974 | 11/1965 | Samms | 102/49.5 |
| 3,384,016 | 5/1968 | Blanchard, Jr. | 102/49.5 |
| 3,534,686 | 10/1970 | Watson | 102/49.5 |

Primary Examiner—Verlin R. Pendegrass

[57] ABSTRACT

This invention is a rocket which has a thrust stage located at the lowermost stage and an arbitrary number of propellant stages which are cut off in turn from a propellant stage located at the uppermost stage after exhausting fuel therein.

5 Claims, 12 Drawing Figures

FIG. 12
FIG. 11
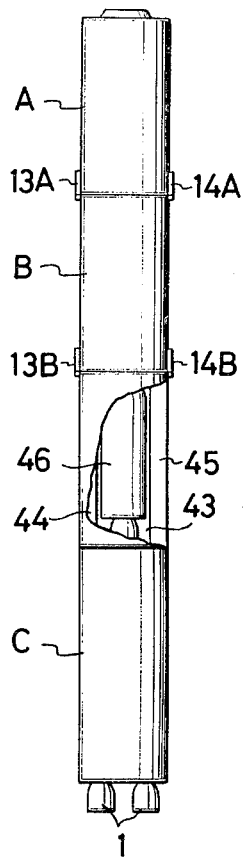
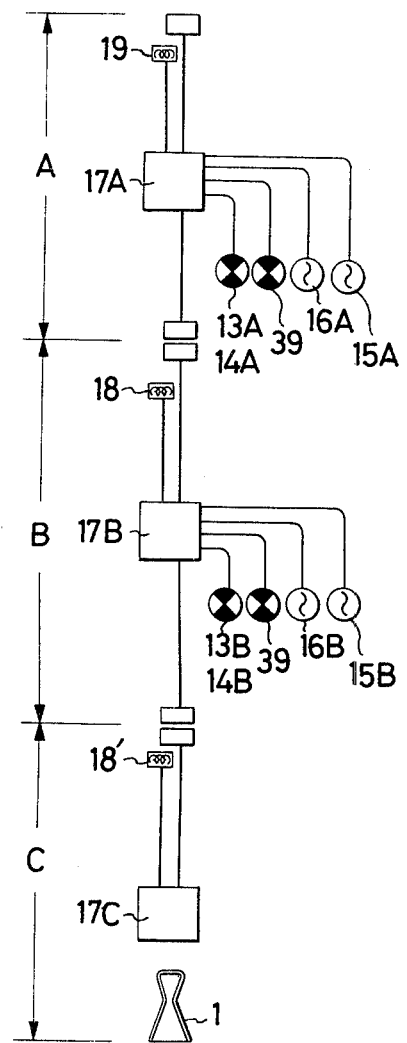

LIQUID FUEL MULTISTAGE ROCKET

The present invention relates to a liquid fuel multistage rocket and more particularly to a multistage rocket wherein a plurality of propellant stage bodies are provided to cut off in turn after exhausting liquid fuel contained in each body of the propellant stages thereby to launch a load, such as a satellite, an intercontinental ballistic missile, or the like, which is provided on a thrust stage body disposed in the lowermost stage of the rocket.

Generally, in order to obtain sufficient speed in such a rocket, it is necessary to cut off in turn the exhausted fuel tanks, oxidant tanks, casings or the like from the rocket because of the reduction in speed caused by these unnecessary masses.

Accordingly, the rocket can obtain a sufficient speed by increasing its stage number and can reduce failure of launching. However, in the multistage rocket in the prior art, each of the rocket bodies provides a combustion chamber, a fuel supply pump, an oxidant supply pump, a drive turbine, a propellant igniting device, a control device and an inducing device (hereinafter called a thrust generating device) in respective tail portions and the launching of a load contained in the rocket body of the uppermost stage is carried out by exhausting fuel in turn from the rocket bodies disposed at the lower stage and cutting off them.

Therefore, since the multistage rocket has as many thrust generating devices as stages, the whole mass of the rocket is not effectively reduced because the number of the thrust generating devices increases according to the addition of the stage number. Further, the launching cost becomes enormous with many loadings of the thrust generating devices which occupy a large rate to the whole weight of the rocket and it was obliged to use a small-sized thrust generating device because of being not capable of increasing a mass ratio (a ratio of a mass when the propellant was loaded and a mass when it was exhausted). Particularly, because the rocket can not obtain a high output power due to a minute drive turbine and is impossible to supply large amounts of fuel into the fuel chamber, its combustion effeciency was remarkably lowered since the combustion time was long and the loss caused by gravity acting during the combustion was large.

In addition, since the rocket is provided with the thrust generating device at each stage and the failure of the launching is brought by any trouble occurring from their devices, they have caused the rocket to have a lower launch reliability.

To avoid the above disadvantages, one object of the present invention is to provide a liquid fuel multi-stage rocket wherein the rocket can effectively obtained a high speed in spite of not loading increased thrust devices according to an addition of the stage number and a sufficient space and a design mass of the thrust generating device are maintained therein so as to utilize a thrust generating device which is large in size and high in output power, as well as the gravity loss can be remarkably reduced by a drive turbine having a high output power.

Another object of the present invention is to provide a liquid fuel multistage rocket wherein an open and closed valve of a propellant having a simple structure can be securely controlled in the connecting portion of each stage when the propellant of the uppermost stage is supplied into a combustion chamber of a thrust generating device located at the lowermost stage in order to perform the above object.

A further object of the present invention is to provide a liquid fuel multistage rocket wherein propellant bodies connected in an arbitrary number of stages can be mass-produced as a unit and many kinds of multistage rockets can be manufactured only by connecting necessary stage numbers according to a desired air distance.

A still further object of the present invention is to provide a liquid fuel multistage rocket from which expensive devices, such a thrust generating device, rocket engine or the like can be recovered on the ground.

Other objects and advantages of the present invention will become apparent during the following discussion of the accompanying drawings, wherein:

FIG. 11 is an explanatory view of an electrical control device according to the present invention;

FIG. 12 is an explanatory view of a rocket applying the present invention.

Figure 1:
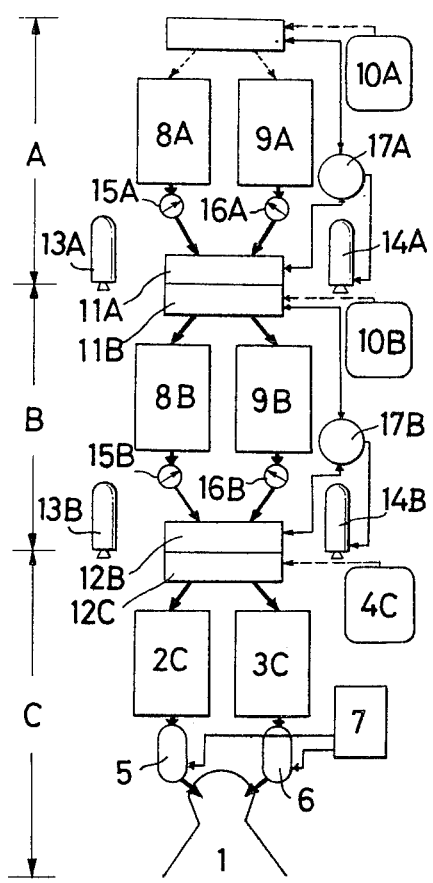
FIG. 1 is a block diagram showing a basic principle of the present invention.
Figure 2:
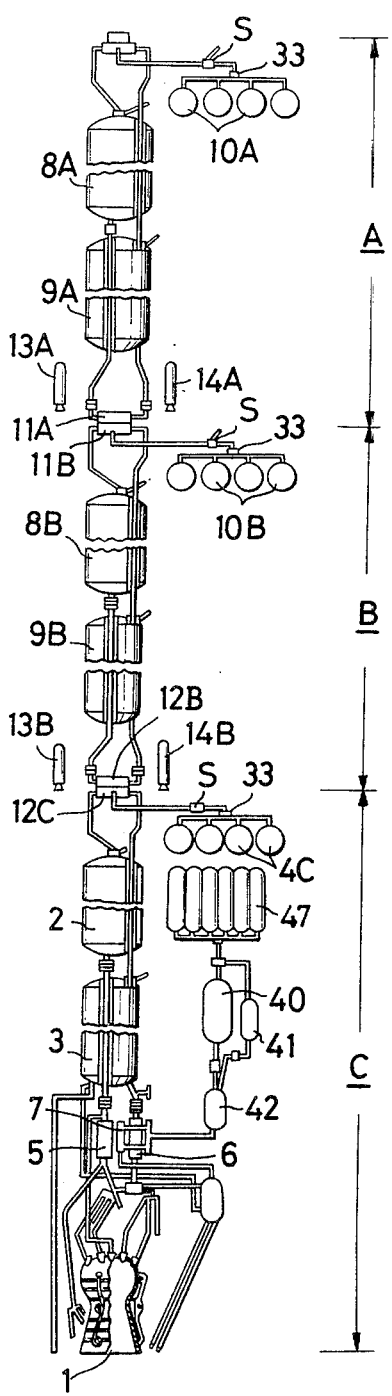
FIG. 2 is a whole explanatory view of a three stage rocket adopting the present invention, but a housing being abbreviated therein.
Figure 3:
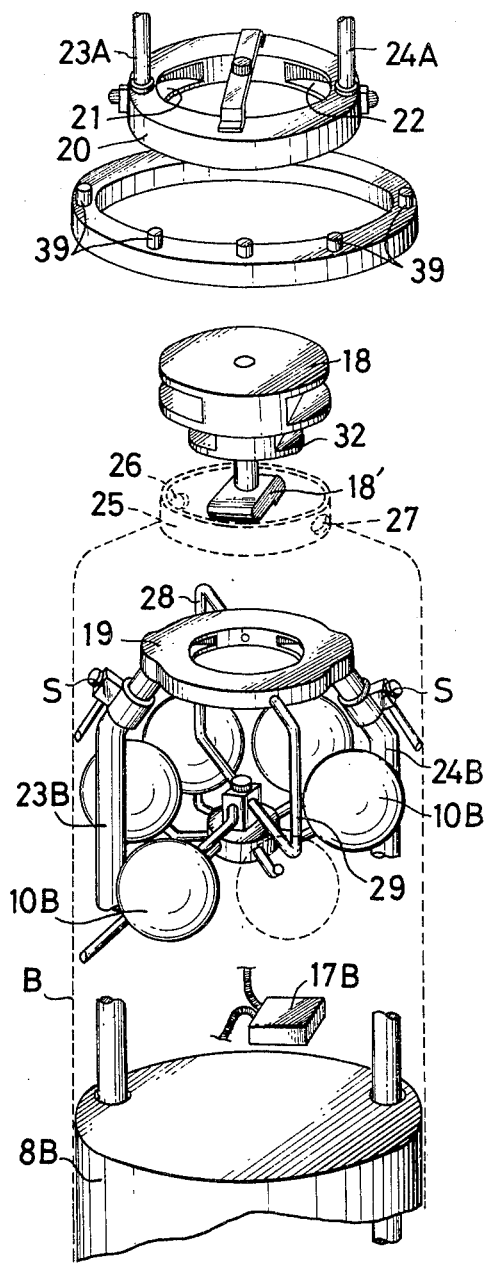
FIG. 3 is an exploded perspective view showing a connecting portion between superior and subordinate stage.
Figure 4:
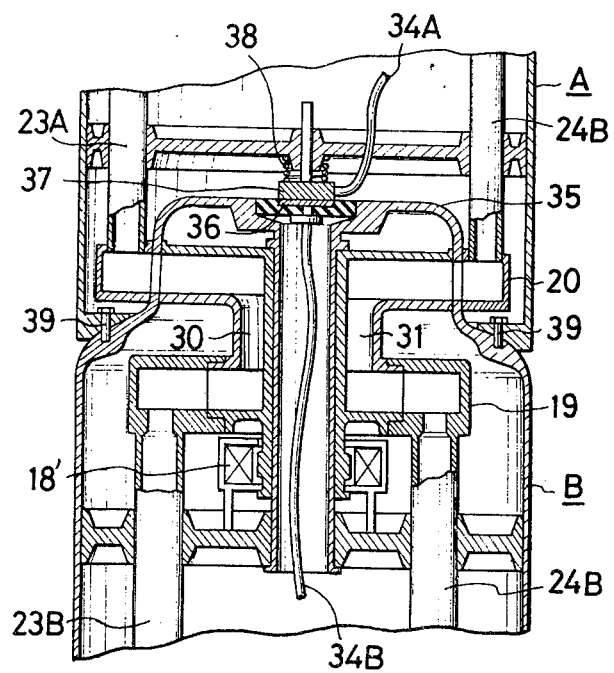
FIG. 4 is a longitudinal elevation showing only the connecting portion.
Figure 5:
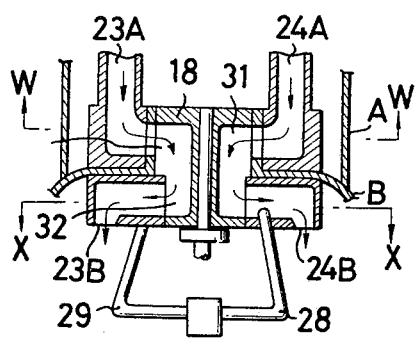
FIG. 5 is an explanatory view of an open and closed valve for propellant disposed in the connecting portion in a open position.
Figure 8:
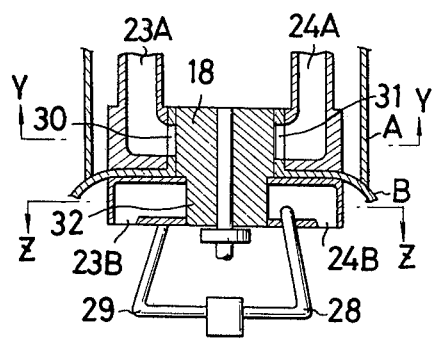
FIG. 8 is an explanatory view of the valve for propellant disposed in the connecting portion in a closed position.
Figure 6:
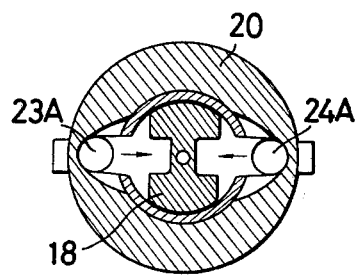
FIGS. 6 and 7 are sectional views taken along lines W — W and X — X in FIG. 5, respectively.
Figure 9:
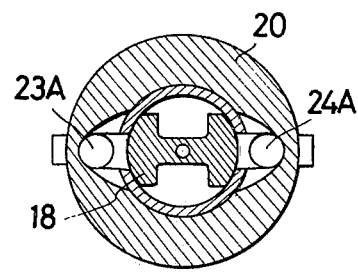
FIGS. 9 and 10 are sectional views taken along lines Y — Y and Z — Z in FIG. 8, respectively.
Figure 7:
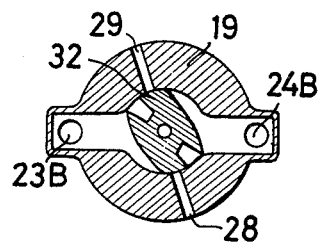
Figure 10:
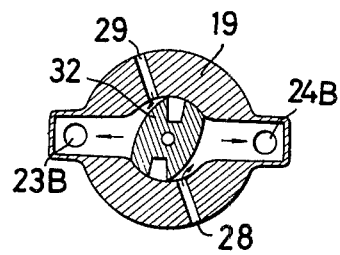

Referring now to FIG. 1, the basic principle of the present invention is described with a block diagram. In the figure, there are provided within a thrust stage body C of the lowermost stage a combustion chamber 1, an oxidant tank 3C, a fuel tank 2C, a pressurized gas tank 4C and a load shed portion (not shown), in addition to a usual thrust generating device, for example, a fuel supply pump 5, an oxidant supply pump 6 and a drive turbine 7 for driving the pumps. Above an upper portion of the thrust generating device a second propellant stage body B and a first propellant stage body A are connected in turn in an upstream direction by an explosive bolt (described hereinafter) and the first and second propellant stage bodies A and B are provided with fuel tanks 8A and 8B, oxidant tanks 9A and 9B, and pressurized gas tanks 10A and 10B therein.

The fuel and oxidant tanks in each of the propellant stage bodies A and B are respectively connected to the combustion chamber 1 of the lowermost stage through intermediary of connecting devices 11A, 11B, 12B and 12C having an open and closed valve (described hereinafter). Also, there are two small-sized rockets 13A, 13B, 14A and 14B for cut off on peripheral walls of the propellant stage bodies A and B, the small-sized rocket devices 13A, 13B, 14A and 14B being constructed to inject with an electrical signal to cause when flow meters 15A, 15B, 16A and 16B for the fuel and oxidant tank in the propellant stage bodies A and B indicate an empty condition of the tanks.

The rocket, then, is launched by feeding the fuel and oxidant contained in the first propellant body A located at the uppermost stage into the combustion chamber 1 of the lowermost stage and by igniting them. In this condition, a pressurized gas tank is connected to the fuel tank 8A and the oxidant tank 8B to fill a space portion formed in the tanks. When the fuel tank 8A and the oxidant tank 9A in the first propellant stage body A of the uppermost stage become empty, the flow meters 15A and 16A first detect it to intercept the connection between the combustion chamber 1 and the fuel and oxidant tanks 8A and 9A in the first propellant stage body A through an electrical control device 17B in the second propellant stage body B. And then, the connection between the first and second propellant stages A and B is released by an explosive bolt there between and at the same time two small-sized rockets 13A and 14A for cut off in the first propellant stage body A are injected. Hereupon, only the first propellant stage body A is rapidly accelerated to separate from the second propellant stage body B and the thrust stage body C. In this case, since the small-sized rocket, for example, is so constructed that they have different combustion times each other, the first propellant stage body A deviates from the orbit of the sequent propellant stage body B and the thrust stage body C. The second propellant stage body B, also, is cut off from the thrust stage body C in the same manner just above mentioned.

Thus, according to the present invention, it is not necessary to equip the rocket with a thrust generating device in the tail portion of each stage as a conventional multistage rocket, and the rocket can perform an expected object since it is provided with a thrust generating device only in the thrust stage body C.

The structure, further, will describe in detail with reference to FIGS. 2 to 12. Equipped in the propellant stage bodies A and B the thrust stage body C are the fuel tanks 8A, 8B and 3C, the oxidant tanks 9A, 9B and 2C, the pressurized gas tanks 10A, 10B and 4C. The fuel tanks 8A, 8B and 2C and the oxidant tanks 9A, 9B and 3C are connected extending above and below, and the pressurized tanks 10A, 10B and 4C of each stage are connected to the fuel tanks 8A, 8B and 2C and oxidant tanks 9A, 9B and 3C located at the same stages, respectively. Referring to the first and second propellant stage bodies A and B, there are connected, through the intermediary of a rotating drum valve 18 provided in the connecting portion between the first and second propellant stage bodies A and B, the liquid fuel tank 8A in the first propellant stage body A to the liquid tank 8B in the second propellant stage body B, the oxidant tank 9A in the first propellant stage body A to the oxidant tank 9B in the second propellant stage body B, and the pressurized gas tank 10B in the former to the liquid fuel tank 8B and oxidant tank 9B in the second propellant stage body B, respectively. The rotating drum valve 18 is rotatably constructed by a proper rotating mechanism 18' so as to communicate and close a connection between the propellants for the first and second liquid fuel tanks 8A and 8B and oxidant tanks 9A and 9B and a filling connection between the second pressurized gas tank 10B and the second liquid fuel tank 8B and oxidant tank 9B, in opposite relationship to each other.

Namely, the rotating drum valve 18 is constructed by a fourway valve as shown in FIGS. 3 to 10 and is adapted rotatably to fit with a valve seat ring 19 fixed to the second propellant body B and with an annular connecting portion 20 formed on the first propellant stage body A and having communicating bores 21 and 22 perforated in two portions of opposite side walls. A fuel pipe 23A and an oxidant pipe 24A of the first fuel tank 8A are connected to the annular connecting portion 20 fixed to the first propellant stage body A and the annular connecting portion 20 is adapted to fit with a neck portion 25 of the second propellant stage body B. Also, two communicating bores 26 and 27 are formed in the neck portion 25. The valve seat ring 19 is connected with the fuel pipe 23B of the second fuel tank 8B at a side of the fuel pipe 23A and at a side of the oxidant pipe 24A, with an oxidant pipe 24B of the second oxidant tank 9B. At a position having a distance of 45° from the above, a second pressurized gas tank 10B is connected by gas pipes 28 and 29 to communicate with the fuel pipe 23B and the oxidant pipe 24B. Becesses 30 and 31 are longitudinaly provided at a position having a distance of 180° on an upper portion of the rotating drum valve 18 fitting with the valve seat ring 19 so as to communicate with the fuel pipe 23B and oxidant pipe 24B of the valve seat ring 19 and a cam valve 32 are provided at a lower portion of the rotating drum valve 18. In a condition that the pipes 23A and 23B which are a passage of the liquid fuel and the pipes 24A and 24B which are a passage of the oxidant are communicated therewith, the gas pipes 28 and 29 are closed (FIGS., 5, 6, 7) and inversely, in a condition that the passages of the propellant are closed, the gas pipes 28 and 29 are opened (FIGS. 8, 9, 10), accordingly, the passages of the propellant and the passage for filling the tank are inversely opened and closed each other. Further, a character S in the figure shows a check valve and pressure adjusting device and numeral 33 a distributing valve. The following is a description with reference to a control of rotation of the rotating drum valve 18. As a rotating mechanism 18' of the drum valve 18, there may adopt a solenoid, a mechanism that a stopper to urge and maintain a spring engaging the rotating drum valve 18 is released by an explosion of a small-sized cartridge or an operation of an electromagnetic valve in a hydraulic device, or the like, but a solenoid mechanism is shown in the figure. Further, perforating bores for lead wires are perforated in a rotating center of the rotating drum valve 18 and the first and second propellant stage bodies A and B are constructed to have the following electrical connection.

Namely, a live portion 36 of an electric conductor is provided, for example, by a shrinkage fit or a threaded engagement and a contact plate 37 of the lead wire 34A in the first propellant stage body A is forced to contact by a spring from the upper side of the live portion so as to electrically connect the first and second propellant stage bodies A and B.

Referring now to FIG. 11 showing the electrical diagram, the flow meters 15A, 15B, 16A and 16B are provided on the fuel tanks 8A and 8B the oxidant tank 9A and 9B of the propellant stage bodies A and B and the rocket body C. When the liquid fuel of the oxidant is exhausted, the amplified current actuates the solenoid 18' of the rotating drum valve 18 in the first propellant stage body A through the intermediary of a control mechanism 17B for electric system in the second propellant stage body B and then a microswitch (not shown) operates with the rotation of the drum valve 18 so as to ignite and explode an explosive bolt 39 and the small-sized rockets 13A and 14A of the first propellant stage body A. The first and second propellant stage bodies A and B in this electric system are connected by the contact plates 37 and to the live portion 36 mentioned above.

Further, in the rocket body C located at the lowermost stage, the liquid fuel tank 2C is connected to the combustion chamber 1 through the fuel pump 5 and the oxidant tank 3C is similarly connected to the combustion chamber 1 through the oxidant pump 6. A drive turbine 7 is connected to the pumps 5 and 6. They, further, are provided with a usual thrust generating device of the liquid fuel rocket, a compressed nitrogen bomb 47, a hydrogen peroxide tank 40, a catalyzer tank 41 and a gas generator 42. The rotating drum valve 18 communicates above and below the propellant, i.e., the fuel tanks 8A, 8B and 2C and the oxidant tanks 9A, 9B and 3C and the pressurized gas tanks 10B and 4C of each stage are set at the closed condition but only the pressurized gas tank 10A of the uppermost stage leaves to communicate with the liquid fuel tank 8A and the oxidant tank 9A.

Thus, when the propellant is supplied into the combustion chamber 1 and ignited therein, the first and second propellant stage bodies A and B and the thrust stage body C are launched and the liquid fuel and oxidant contained in the first propellant stage body of the uppermost stage is first exhausted. In this condition, the spaces which are formed in the liquid fuel tank 8A and oxidant tank 9A are filled with gas from the pressurized gas tank 10A of the uppermost stage. If either of the liquid fuel and oxidant in the first propellant stage body A is exhausted, either of the flow meters 15A and 16A actuates and its actuation transmits to the lead wire 34B so as to actuate the solenoid 18' of the second propellant stage body B thereby to rotate the rotating drum valve 18 for 45°. Hereupon, the connections are closed (FIG. 8) between the fuel pipes 23A and 23B and between the oxidant pipes 24A and 24B, respectively and the pressurized gas tank 10B in the second propellant stage body B and the fuel and oxidant tanks 8B and 9B in the second propellant stage body B are communciated. When the rotating drum valve 18 rotates, the microswitch (not shown) actuates and the explosive bolt and small-sized rockets 13A and 14A in the first propellant stage body A which was empty are exploded. By exploding the explosive bolt, the connection between the first propellant stage body A and the second propellant stage body B is released and only the first propellant stage body A is rapidly accelerated by the small-sized rocket devices 13A and 14A so as to separate from the second propellant stage body B and the thrust stage body C. Since the small-sized rocket devices 13A and 14A, for example, are so constructed to have different combustion times, the first propellant stage body A which was cut off deviates from the orbit of the lower propellant stage body B and the thrust stage body C. Similarly, the second propellant stage body B is cut off after the propellant was exhausted and a satellite (not shown) in the final thrust stage body C is launched.

As understood from the above description, since the rocket according to the present invention cuts off the propellant stage body A of the uppermost stage by accelerating with the small-sized rocket devices 13A and 14A after the liquid fuel in the body A was exhausted, the thrust generating device is desirable to provide only in the thrust stage body C of the lowermost stage and can occupy a sufficient space and a design mass upon designing, as well as can use a large-sized and high output turbine as a drive turbine 7 to thereby extremely reducing the combustion time.

Further, since the rocket is not necessary to provide many thrust generating devices according to addition of the stage number for cutting off, a high speed is obtained in proportion to the addition of the stage number and can effectively increase the stage number of the rocket.

In addition, the present invention will include the following advantages.

Namely, the propellant system, such as the liquid fuel, the oxidant, the pressurized gas or the like is securely opened and closed by providing the rotating drum valve 18 at the connecting portion of the first and second propellant stage bodies A and B, and since the construction only rotates the rotating drum valve 18 with a proper rotating mechanism 18', the control is very simple and sure as compared with a case that opens and closes various valves, the reliability of the valve being remarkably high. As shown in FIG. 12, the thrust stage body C has a load shed portion 43 in which a launcher is formed by, for example, a fuel pipe 44 and an oxidant pipe 45, a load rocket 46 being provided in the launcher. A load is housed in the load rocket 46 and after launching the load rocket 46 is ejected from the thrust stage body C which is recovered on the ground. Furthermore, according to the present invention, various kinds of liquid fuel multistage rockets can be manufactured by connecting a proper stage number of the propellant stage bodies A and B mass-produced by the same standard according to a desired distance.

As many apparently widely different embodiments of the present invention may be made without departing from the spirit and scope thereof, it is to be understood that the invention is not limited to the specific embodiments thereof except as defined in the appended claims.

What I claim is:

1. A liquid fuel multistage rocket comprising:
    a thrust stage body located at the lowermost stage and having a thrust generating device, a combustion chamber, a thrust stage fuel tank, and a thrust stage oxidant tank;
    a propellant stage body disposed above said thrust stage body and having a propellant stage fuel tank and a propellant stage oxidant tank;
    an open and close valve means coupling said fuel tanks to each other and coupling said oxidant tanks to each other, whereby said propellant stage fuel and oxidant tanks are emptied of their propellant prior to emptying said thrust stage fuel and oxidant tanks; and
    small-sized rocket means on said propellant stage body to separate said propellant stage body from said thrust stage body when said propellant stage fuel and oxidant tanks are empty.

2. A liquid fuel multistage rocket according to claim 1 wherein, said thrust stage body contains a launcher therein.

3. The liquid fuel multistage rocket as claimed in claim 1, including:
    a plurality of said propellant stage bodies arranged one above the other;

a plurality of said valve means coupling said fuel tanks of adjacent bodies to each other and said oxidant tanks of adjacent bodies to each other, whereby the uppermost of said propellant stage fuel and oxidant tanks are empties of their propellant prior to emptying the adjacent lower fuel and oxidant tanks; and a plurality of said small-sized rocket means, one of each of said small-sized rocket means on each of said propellant stage bodies for separating each of said propellant stage bodies from an adjacent lower body when the tanks of each propellant stage body are empty.

4. A liquid fuel multistage rocket comprising:

a thrust stage body located at the lowermost stage and having a thrust generating device, a combustion chamber, a thrust stage fuel tank, a thrust stage oxidant tank, and a thrust stage pressurized gas tank;

at least one propellant stage body disposed above said thrust stage body and having a propellant stage fuel tank, a propellant stage oxidant tank, and a propellant stage pressurized gas tank connected to said propellant stage fuel and oxidant tanks;

a connecting portion between said bodies having a rotating drum valve coupling said fuel tanks to each other and coupling said oxidant tanks to each other, said rotating drum valve having a rotating mechanism for rotating said valve to a propellant open position in which propellant can flow between the coupled tanks, and a propellant closed position in which propellant cannot flow between the coupled tanks, said rotation drum valve communicating with said thrust stage pressurized gas tank to permit pressurization of said thrust stage fuel and oxidant tanks when said valve is in said propellant closed position, whereby said propellant stage fuel and oxidant tanks are emptied of their propellant prior to emptying said thrust stage fuel and oxidant tanks; and small-sized rocket means on said propellant stage body to separate stage body from said thrust stage body when said propellant stage fuel and oxidant tanks are empty.

5. A liquid fuel multistage rocket comprising:

a thrust stage body located at the lowermost stage, a thrust generating device and a combustion chamber provided in said thrust stage body;

at least one propellant stage body disposed above said thrust stage body;

a fuel tank and an oxidant tank connected to said combustion chamber through the intermediary of a proper open and closed valve; and small-sized rocket means provided on said propellant stage body to cut off the latter from said thrust stage body, said thrust stage body and said propellant stage body including a rotating drum valve in a connecting portion there between liquid fuel tanks and oxidant tanks of said thrust and propellent stage bodies being respectively connected to each other, said propellant stage body including a pressurized gas tank connected to said liquid fuel tank and oxidant tank of said propellant stage body, said rotating drum valve being so constructed that it is rotatable with a proper rotating mechanism so as to communicate and close in opposite relationship with each other a propellant connection between said liquid fuel tanks and said oxidant tanks and a tank filling connection between said pressurized gas tank and said liquid fuel and oxidant tanks of said propellant stage body.

* * * * *